(12) United States Patent
Han (10) Patent No.: US 12,444,236 B2
(45) Date of Patent: Oct. 14, 2025

(54) DEEP LEARNING-BASED ABNORMAL BEHAVIOR DETECTION SYSTEM AND METHOD USING ANONYMIZED DATA

(71) Applicant: UNIUNI CORPORATION, Seoul (KR)

(72) Inventor: Soo Yeon Han, Seoul (KR)

(73) Assignee: UNIUNI CORPORATION, Seoul (KR)

( * ) Notice: Subject to any disclaimer, the term of this patent is extended or adjusted under 35 U.S.C. 154(b) by 330 days.

(21) Appl. No.: 18/265,364

(22) PCT Filed: Aug. 30, 2021

(86) PCT No.: PCT/KR2021/011583
§ 371 (c)(1),
(2) Date: Jul. 3, 2023

(87) PCT Pub. No.: WO2022/119080
PCT Pub. Date: Jun. 9, 2022

(65) Prior Publication Data
US 2024/0046702 A1 Feb. 8, 2024

(30) Foreign Application Priority Data
Dec. 4, 2020 (KR) .......................... 10-2020-0168545

(51) Int. Cl.
*G06V 40/20* (2022.01)
*G06N 3/0464* (2023.01)
(Continued)

(52) U.S. Cl.
CPC ........... *G06V 40/20* (2022.01); *G06N 3/0464* (2023.01); *G06V 10/40* (2022.01); *G06V 10/761* (2022.01);
(Continued)

(58) Field of Classification Search
CPC ...... G06V 10/40; G06V 10/82; G06V 10/761; G06V 10/764; G06V 20/52; G06V 40/20; G06N 3/0464
See application file for complete search history.

(56) References Cited

U.S. PATENT DOCUMENTS

2019/0260777 A1* 8/2019 Mehrotra ................ H04L 63/08
2021/0295581 A1* 9/2021 Roland ..................... G06T 5/77

FOREIGN PATENT DOCUMENTS

KR 10-2011-0028703 A 3/2011
KR 10-1194167 B1 10/2012
(Continued)

OTHER PUBLICATIONS

Lee. et al. (Computer English Translation of Korean Patent No. KR 2020-0059643 A) (Year: 2020).*

*Primary Examiner* — Daniel G Mariam
(74) *Attorney, Agent, or Firm* — Maschoff Brennan (57) ABSTRACT

The present invention relates to a deep learning-based abnormal behavior detection system using anonymized data to sense abnormal behavior such as installing hidden cameras in a set area such as a bathroom. The present invention comprises: an anonymized image data generation unit for sensing the behavior of a subject in a set area, and generating image data in which personal information of the subject has been anonymized; and an abnormal behavior identification unit for categorizing the anonymized image data as normal or abnormal behavior data using a model trained with abnormal behaviors.

8 Claims, 4 Drawing Sheets

(51) Int. Cl.
*G06V 10/40* (2022.01)
*G06V 10/74* (2022.01)
*G06V 10/764* (2022.01)
*G06V 10/82* (2022.01)
*G06V 20/52* (2022.01)

(52) U.S. Cl.
CPC ............ *G06V 10/764* (2022.01); *G06V 10/82* (2022.01); *G06V 20/52* (2022.01)

(56) References Cited

FOREIGN PATENT DOCUMENTS

| KR | 10-1845077 B1 | 4/2018 |
| KR | 10-2016253 B1 | 8/2019 |
| KR | 10-2020-0103194 A | 9/2020 |

* cited by examiner

DEEP LEARNING-BASED ABNORMAL BEHAVIOR DETECTION SYSTEM AND METHOD USING ANONYMIZED DATA

TECHNICAL FIELD

The present disclosure relates to a deep learning-based abnormal behavior detection system and method.

BACKGROUND ART

Recently, with the development of electronic and optical technologies, the performance of cameras has improved and the size of cameras has become smaller and smaller, and the use of these cameras to commit crimes has become more frequent. For example, there has been a surge in the use of hidden cameras, which combine tiny cameras with microphones and small, high-performance wireless transmitters, in places used by a large number of unspecified people in an attempt to spy on and record the internal situation.

Electronic civilization, which has been developing rapidly since the 2000s, has automated various devices to make modern people's lives richer and more convenient. However, electronic devices that can easily detect other people's secrets have also been developed, and there is a risk that modern people's secret information will be exposed regardless of the intentions of the people concerned.

There are a growing number of cases where hidden cameras, which combine ultra-compact cameras with high-performance, small wireless transmitters, are secretly installed in specified places such as public baths, restrooms, dressing rooms, hotels, offices, etc. to peek inside, record internal situations, and use the recordings for illegal purposes, thereby violating the privacy of individuals.

In particular, hidden cameras are frequently installed in places where privacy must be protected due to the inevitable exposure of the body, such as fitting rooms in clothing stores, entertainment facilities such as water parks, restrooms in various stores, and lodging facilities, and the videos recorded by hidden cameras are leaked, causing enormous damage to the victims of the crime.

In order to detect hidden cameras, a separate detector is required. When detecting a hidden camera using the detector, the detector faces an issue of 'reactive detection', which means that the detector detects the hidden camera after the crime has occurred.

However, acts such as installing a hidden camera in a place where privacy is required cause abnormal behavior patterns. Therefore, if abnormal behavior can be detected in advance, illegal acts can be prevented in terms of 'proactive prevention', and there is an urgent social need to detect such abnormal behavior.

DISCLOSURE

Technical Problem

Therefore, the present disclosure has been made in view of the above problems, and it is one object of the present disclosure to provide an abnormal behavior detection system that allows users to use public facilities with peace of mind by detecting and preventing abnormal behavior of subjects within a predetermined area.

The objects of the present disclosure are not limited to the above-mentioned objects, and other objects not mentioned will be apparent to one of ordinary skill in the art from the following description.

Technical Solution

In accordance with one aspect of the present disclosure, provided is a deep learning-based abnormal behavior detection system including a detection device configured to detect a behavior of a subject within a predetermined area and generate anonymized image data; a deep learning server configured to receive the anonymized image data from the detection device, extract feature information from the anonymized image data, output behavior prediction information reflecting temporal changes of the feature information, compare the behavior prediction information with pre-learned behavior patterns to calculate similarity, and determine whether the behavior prediction information belongs to a normal behavior type or an abnormal behavior type based on the similarity to determine abnormal behavior; and a web server configured to receive a result of determining the abnormal behavior from the deep learning server and to generate and transmit to a management server or a terminal a warning signal indicating that the behavior of the subject is an abnormal behavior when the anonymized image data is determined to belong to the abnormal behavior type.

The detection device includes a time of flight (ToF) sensor.

The deep learning server includes a CNN configured to extract feature information from the received anonymized image data; an LSTM configured to receive the feature information from the CNN in time series and output the behavior prediction information reflecting the temporal changes; and a classification layer configured to compare the behavior prediction information received from the LSTM with the learned behavior patterns. The classification layer determines a learned behavioral pattern most similar to the behavior prediction information among the learned behavioral patterns based on the similarity, and determines a behavior type to which the most similar behavior pattern belongs as a behavior type of the behavior prediction information.

In accordance with another aspect of the present disclosure, provided is a deep learning-based abnormal behavior detection system for detecting a behavior of a subject within a predetermined area and analyzing a behavior pattern, including a receiver configured to receive anonymized image data in time series from a sensor configured to detect the predetermined area, the anonymized image data being generated by detecting the behavior of the subject within the predetermined area; an abnormal behavior determiner configured to: extract feature information from the received anonymized image data, output behavior prediction information reflecting temporal changes of the feature information, compare the behavior prediction information with pre-learned behavior patterns to calculate similarity, and determine whether the behavior prediction information belongs to a normal behavior type or an abnormal behavior type based on the similarity to determine abnormal behavior; and a transmitter configured to transmit to a management server or terminal a signal indicating that the behavior of the subject is an abnormal behavior, when the anonymized image data is determined by the abnormal behavior determiner to belong to the abnormal behavior type.

The sensor is a time of flight (ToF) sensor or a thermal imaging sensor.

The abnormal behavior determiner includes a CNN configured to extract feature information from the received anonymized image data; an LSTM configured to receive the feature information from the CNN in time series and output the behavior prediction information reflecting the temporal changes; and a classification layer configured to compare the behavior prediction information received from the LSTM with the learned behavior patterns. The classification layer determines a learned behavioral pattern most similar to the behavior prediction information among the learned behavioral patterns based on the similarity, and determines a behavior type to which the most similar behavior pattern belongs as a behavior type of the behavior prediction information.

The deep learning-based abnormal behavior detection system may further include a warning notifier configured to generate a warning signal to be recognized by the subject when the anonymized image data is identified as abnormal behavior data by the abnormal behavior determiner.

The deep learning-based abnormal behavior detection system may further include an emergency notifier configured to transmit, when the anonymized image data is identified as abnormal behavior data by the abnormal behavior determiner, an emergency signal to the management server in recognition of an external emergency.

Advantageous Effects

According to the present disclosure, various crimes may be proactively prevented by detecting abnormal behavior such as secretly installing cameras in specified areas such as restrooms.

In addition, according to the present disclosure, the issue of personal privacy may be resolved by obtaining anonymized images of various behaviors in the restroom that do not reveal any personal information.

It will be further understood that the effects described in the following disclosure that are anticipated by the technical features of the present disclosure and their potential effects, even if not expressly mentioned herein, shall be treated as if they were described in the disclosure.

BEST MODE

In describing the present disclosure, a detailed description of known functions and configurations apparent to those skilled in the art will be omitted to avoid obscuring the subject matter of the present disclosure.

The present disclosure relates to a system for detecting abnormal behavior, such as the installation of a hidden camera in a toilet, or dangerous situations, such as a collapse or fall, by analyzing anonymized image data based on deep learning, and more particularly, to a technology for determining abnormal behavior by autonomously analyzing human behavior.

Figure 1:
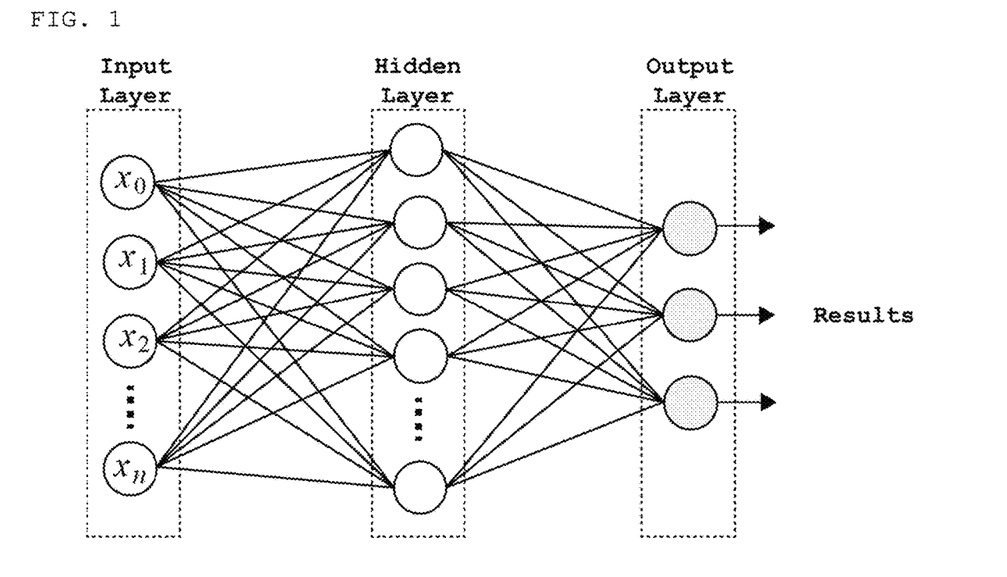
FIG. 1 is a schematic diagram illustrating a structure of a multi-layer neural network model (deep learning or deep neural network model).

A multi-layer neural network model, which generally refers to deep learning, has the structure shown in FIG. 1. FIG. 1 is a schematic diagram illustrating a structure of a multi-layer neural network model (deep learning or deep neural network model). As shown in FIG. 1, a multi-layer neural network model includes an input layer, a hidden layer, and an output layer. The input layer consists of nodes corresponding to each input variable, and the number of nodes is equal to the number of input variables. The hidden layer serves to process the linear combination of values of variables received from the input layer with a non-linear function, such as a sigmoid function, and deliver the result to the output layer or another hidden layer. However, applying the chain rule in back propagation may cause the issue of vanishing gradient, where the error is diluted in the previous layer. Instead of the sigmoid function, a rectified linear unit (ReLU) may be used.

In other words, the sigmoid function has a value between 0 and 1. When using gradient descent to perform backpropagation, the gradient is continuously multiplied as it passes through the layers. Thus, the gradient converges to 0, which may not work well as the number of layers increases. Therefore, to address this issue with the sigmoid function, ReLU may be used, which outputs 0 if the input value is less than 0 and outputs the input value if the input value is greater than 0. ReLU can be partially enabled by outputting 0 for inputs below 0. Since it is a linear function with no vanishing gradient, it has the advantage of making the derivative calculation very simple.

The output layer is a node that corresponds to the output variable. In a classification model, as many output nodes as the number of classes are generated.

The present disclosure utilizes such deep learning in a unique way to accurately analyze human behavior and detect abnormal behavior within a predetermined area to detect hidden cameras installed or emergency situations occurring. Hereinafter, an embodiment 1000 according to the present disclosure will be described with reference to the accompanying drawings.

Figure 2:
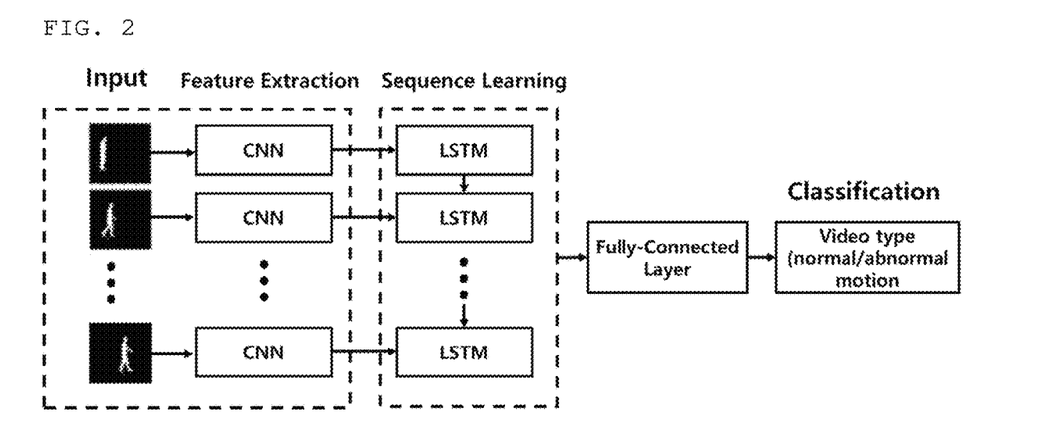
FIG. 2 is a reference diagram illustrating a process for analyzing anonymized image data according to one embodiment of the present disclosure.
Figure 3:
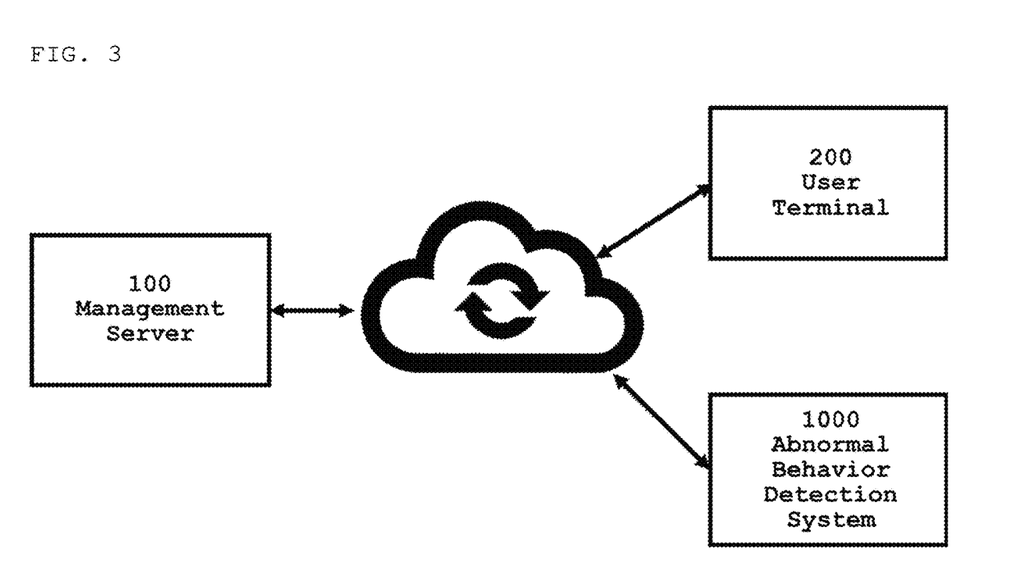
FIG. 3 is a reference diagram schematically illustrating an overall system environment for utilizing a result of determining an abnormal behavior according to one embodiment of the present disclosure.
Figure 4:
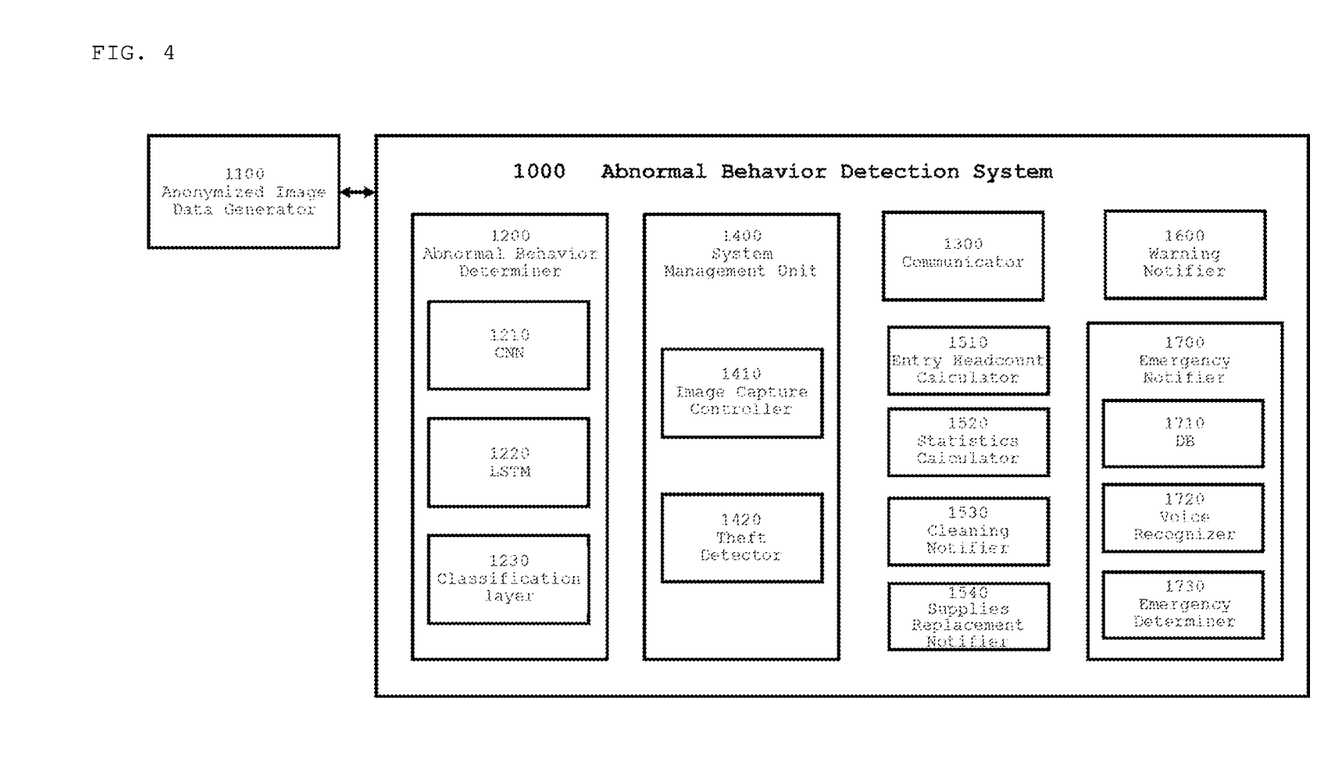
FIG. 4 is a block diagram schematically illustrating a structure of an abnormal behavior detection system according to one embodiment of the present disclosure.
Figure 5:
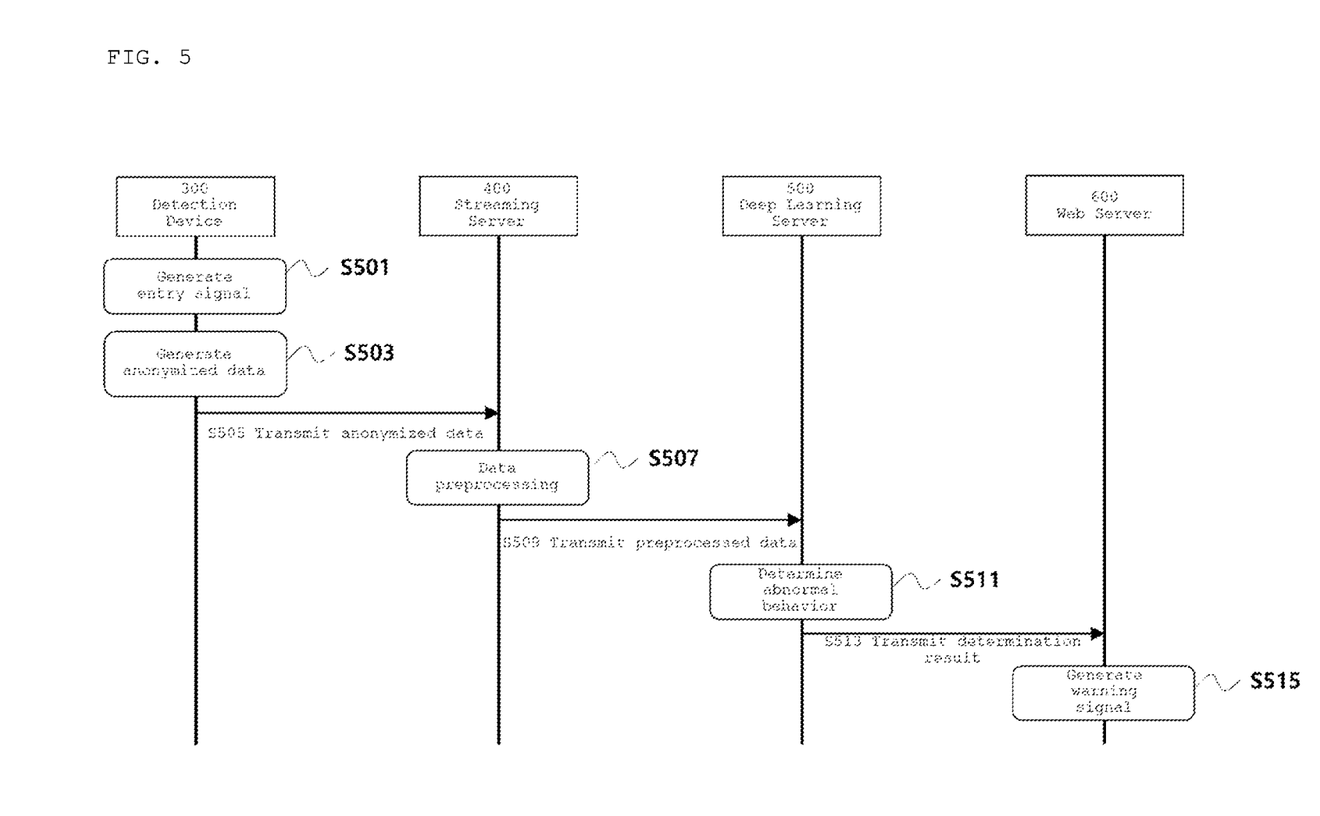
FIG. 5 is a block diagram illustrating a process for determining an abnormal behavior by an abnormal behavior detection system according to one embodiment of the present disclosure.

FIG. 2 is a reference diagram illustrating a process for analyzing anonymized image data according to one embodiment of the present disclosure. FIG. 3 is a reference diagram schematically illustrating an overall system environment for utilizing a result of determining an abnormal behavior according to one embodiment of the present disclosure. FIG. 4 is a block diagram schematically illustrating a structure of an abnormal behavior detection system according to one embodiment of the present disclosure. FIG. 5 is a block diagram illustrating a process for determining an abnormal behavior by an abnormal behavior detection system according to one embodiment of the present disclosure.

In the embodiment described below, an abnormal behavior of installing a hidden camera inside a toilet is exemplarily described. However, the present disclosure is not limited to the behavior of installing a hidden camera inside a toilet, but can also be used to determine abnormal behavior by generating anonymized image information for various abnormal behaviors such as falls or collapses of patients or the elderly, and unauthorized intrusion.

An abnormal behavior detection system 100, which acquires anonymized image information about abnormal behavior of a user and determines whether it is abnormal behavior, includes an anonymized image information generator 1100, an abnormal behavior determiner 1200, a communicator 1300, and a system management unit 1400.

The abnormal behavior detection system 1000 includes an anonymized image data generator 1100 configured to photograph a predetermined area, such as a restroom. The anonymized image data generator 1100 senses the behavior of a subject in the predetermined area, and further generates anonymized image data related to personal information such as the subject's face. As used herein, "anonymize" means processing the information such that the identity of the photographed person is not recognizable. Accordingly, the present disclosure may be operated smoothly in places where personal privacy must be respected, such as restrooms, without causing privacy issues. Furthermore, the embodiment 1000 according to the present disclosure is related to, but not necessarily limited to, situations in a restroom. It can be applied to any predetermined place/space where personal privacy must be respected, such as a locker room or a fitting room in a shopping mall.

The abnormal behavior detection system 1000 according to one embodiment of the present disclosure includes an abnormal behavior determiner 1200 configured to classify anonymized image data into normal behavior data or abnormal behavior data using a learning model for abnormal behavior. The abnormal behavior determiner 1200 is capable of accurately determining abnormal behavior in a restroom with a learning model for abnormal behavior generated through deep learning.

Referring to FIGS. 2 and 4, the abnormal behavior determiner 1200 includes a CNN 1210, an LSTM 1220, and a classification layer 1230 to analyze anonymized image data to accurately detect abnormal behavior.

The CNN 1210 is a type of multi-layer, feed-forward artificial neural network used to analyze visual images, also known as a convolutional neural network. The CNN 1210 receives anonymized image data from the anonymized image data generator 1100 and extracts feature information from the anonymized image data.

The CNN 1210 sends the extracted feature information to the LSTM 1220. The LSTM 1220 is a recurrent neural network capable of long-term dependent learning, also known as long short term memory networks. The LSTM 1220 receives feature information from the CNN 1210 in time series and outputs behavior prediction information reflecting temporal changes.

As shown in FIG. 2, the embodiment 1000 according to the present disclosure extracts feature information from the CNN 1210 and outputs behavior prediction information reflecting temporal changes from the LSTM 1220 to provide connections between frames in a video, thereby significantly improving the accuracy of abnormal behavior detection. According to the present disclosure, the CNN and the LSTM may be combined in various ways, and may also be implemented as a combination between a CNN consisting of two two-dimensional convolutional layers and an LSTM that has increased connectivity by stacking two single-layer unidirectional layers. According to one embodiment of the present disclosure, the CNN 1210 may extract feature information related to spatial characteristics and characteristics of a person as a subject. For example, the feature information may be extracted from video information acquired in a restroom considering characteristics of a space as a restroom and predicting behavioral characteristics of a person performing an act in the space as the restroom.

The LSTM 1220 may determine the context of the behavior based on data frames that are consecutive for a predetermined period of time and output behavior prediction information. When it is determined that the behavior of the subject is abnormal behavior based on the behavior prediction information output from the LSTM 1220, the embodiment 1000 according to the present disclosure transmits an abnormal behavior signal to a management server 100 or a terminal 200, as shown in FIG. 3. To this end, the embodiment 1000 includes a communicator 1300 that transmits an abnormal behavior signal to at least one of the server 100 or the terminal 200 to notify that the behavior of the subject is abnormal behavior when the anonymized image data is identified as abnormal behavior data by the abnormal behavior determiner 1200. The communicator 1300 transmits the abnormal behavior signal to the server 100 or the terminal 200 over a communication network 300, as shown in FIG. 3. Here, the communication network 300 refers to any kind of network, such as a wide area network (WAN), a metropolitan area network (MAN), a local area network (LAN), or a personal area network (PAN).

The anonymized image data generator 1100 may be a thermal imaging camera that detects a subject's body temperature as an image, taking into account the specificity of the space where privacy must be respected. In this case, the anonymized image data generator 1100 generates thermal image data as anonymized image data by capturing images. Accordingly, even if the recording is performed by the present disclosure in a restroom, the captured images provide only temperature data such that the person photographed cannot be identified. Therefore, people can use the restroom without fear. According to another embodiment of the present disclosure, the anonymized image data generator 1100 may be a time of flight (ToF) sensor. The ToF sensor, which is based on a technology for detecting an environment or object by measuring the time it takes for a laser pulse to return after being reflected, is a sensor capable of measuring the distance of an object or performing 3D scanning by measuring the time it takes for light emitted from the sensor to return after being reflected on an object, such as a person. The ToF sensor can detect the distance to and depth of the object based on the travel time of the reflected light signal from the object, enabling more accurate recognition of the motion of the object, such as a person. ToF sensors can accurately detect objects in a short time, and are rarely affected by atmospheric pressure and temperature. In addition, since the sensor uses a laser, it can measure long distances and ranges very precisely. Also, it can ensure eye safety by using low-power infrared laser light as a light source and modulated pulses.

The abnormal behavior determiner 1200 further includes a classification layer 1230 that compares the behavior prediction information input from the LSTM 1220 with learned behavior patterns. The learned behavior patterns are divided into normal and abnormal behavior types. The abnormal behavior type may refer to, for example, the act of installing a hidden camera in a restroom, and the normal behavior type may refer to the act of using the restroom, cleaning the restroom, or changing the toilet paper.

For example, the behavior patterns belonging to the abnormal behavior type may include an act of secretly installing a camera at an upper and lower part of a space partition of a toilet space (a space where a toilet is installed) in the restroom, and an act of secretly installing a camera on a toilet paper rack. Here, the space partition refers to a pair of partitions installed on the left and right sides of the toilet. Accordingly, the abnormal behavior type may be classified into five behavior patterns, which means 1) installing a hidden camera on the top of the left partition, 2) installing a hidden camera on the bottom of the left partition, 3)

installing a hidden camera on the top of the right partition, 4) installing a hidden camera on the bottom of the right partition, and 5) installing a hidden camera on the toilet paper rack. Considering this classification, the behavior patterns belonging to the normal behavior type include 1) the act of using the toilet, and 2) behavior patterns that do not belong to the abnormal behavior type.

The classification layer 1230 compares the behavior prediction information with the learned behavior patterns to determine whether the behavior prediction information belongs to the normal behavior type or the abnormal behavior type. To this end, the classification layer 1230 identifies a behavior pattern that is identical or most similar to the behavior prediction information, and classifies the behavior type to which the derived behavior pattern belongs as the behavior type of the behavior prediction information. Accordingly, according to the present disclosure, the anonymized image data generator 1100 determines whether the behavior of the subject photographed by the anonymized image data generator 1100 is normal behavior or abnormal behavior.

FIG. 5 is a block diagram illustrating a process for determining an abnormal behavior by an abnormal behavior detection system according to one embodiment of the present disclosure.

An abnormal behavior detection system 1000, shown in FIG. 5, includes a detection device 300 installed at a remote location, a streaming server 400, a deep learning server 500, and a web server 600.

The detection device 300 includes the anonymized image data generator 1100 described in the previous embodiment. The detection device can be installed in a space where abnormal behavior can be detected, such as a restroom, in the form of a module or terminal, and includes a ToF sensor or a thermal imaging sensor configured to acquire anonymized image data, a motion sensor configured to detect the motion of a user, a voice recognition means such as a microphone capable of recognizing the user's voice, a speaker capable of outputting a warning sound, and a communication means capable of communicating with an external server.

As shown in the figure, the detection device 300 detects a subject entering a predetermined area through a sensor and generates an entry signal (S501), and when the entry signal is generated, acquires image data by applying power to the anonymized image data generator to generate anonymized data (S503). The generated anonymized data is then transmitted to the streaming server 400 through the process of encoding and encryption.

The streaming server 400 performs predetermined preprocessing, such as encryption/decoding, on the anonymized data received from the detection device 300 (S507), and transmits the preprocessed data to the deep learning server 500 (S509). When data is transmitted from multiple detection devices 300, the streaming server 400 may perform load balancing or the like to allow the deep learning server 500 to process the data smoothly.

The deep learning server 500 includes the CNN 1210, LSTM 1220, and classification layer 1230 described with reference to FIG. 2, and determines abnormal behavior by analyzing the preprocessed anonymized data received from the streaming server 400 based on deep learning (S511). As described above, the deep learning server 500 extracts feature information based on the anonymized data and outputs behavior prediction information to determine whether the behavior prediction information belongs to an abnormal behavior type by calculating similarity through comparison with a pre-learned behavior pattern.

The web server 600 receives the abnormal behavior determination result from the deep learning server 500 (S513) and generates a warning signal to notify that the subject's behavior is an abnormal behavior (S515). Then, the warning signal is delivered to the management server 100 or the terminal 200.

Referring to FIG. 4, the abnormal behavior detection system 1000 according to one embodiment of the present disclosure may further include a system management unit 1400 for managing the status of the system. The system management unit 1400 includes an image capture controller 1410 configured to detect a subject entering a set area, generate an entry signal, and apply power to the anonymized image data generator 1100 when the entry signal is generated. In normal times, the anonymized image data generator 1100 remains turned off to save electricity. When someone enters the toilet compartment in the restroom, the image capture controller 1410 applies power to the anonymized image data generator 1100. The image capture controller 1410 may be a variety of devices that detect the behavior of a person, such as an infrared sensor and a TOF sensor.

In addition, the system management unit 1400 includes a theft detector 1420 configured to detect a vibration or tilt caused by an external impact, generate a theft signal, and transmit the theft notification signal to the management server 100. The theft detector 1420 may include a three-axis gyro sensor or a three-axis accelerometer sensor to detect an external impact. Accordingly, when someone attempts to steal a device implementing the present disclosure, or when a criminal attempting to install a hidden camera attempts to turn off the system of the present disclosure, the theft detector 1420 may immediately detect the attempt and send a theft notification signal to the management server 100, such that the manager can immediately respond to the theft or an attempt to intentionally disable the system of the present disclosure.

The embodiment 1000 according to the present disclosure further includes an entry headcount calculator 1510 that detects a subject entering a toilet stall in a restroom in real time and generates an entry signal, and counts the generated entry signal to derive a headcount value based on the subjects entering a set area. The entry headcount calculator 1510 may be various devices that detect the behavior of people, and may be an infrared sensor or a ToF sensor, like the image capture controller 1410 described above. Additionally, the entry headcount calculator 1510 may be a separate component from the image capture controller 1410. In some cases, the entry headcount calculator 1510 and the image capture controller 1410 may be implemented in the same configuration as one multifunctional device.

The embodiment 1000 according to the present disclosure further includes a statistics calculator 1520 that calculates a date-specific headcount value based on the headcount value and the date value of the day received from the entry headcount calculator 1510, and calculates an hourly headcount value by separating the date-specific headcount values by hour. The statistics calculator 1520 calculates statistical headcount data based on date and time from the date-specific headcount values and the hourly headcount values for a specific date. By generating the statistical headcount data, the statistics calculator 1520 accurately provides data on the number of people entering and exiting the restroom based on date and time. The statistical headcount data may be used as a reference for restroom management by a manager, and may also be used for future management planning by a public organization such as a local government.

The embodiment 1000 according to the present disclosure also includes a cleaning notifier 1530 that transmits a cleaning notification signal based on the headcount value input from the entry headcount calculator 1510. The cleaning notifier 1530 sends a cleaning notification signal to the management server 100 when the input headcount value exceeds a preset reference headcount value. Thus, according to the present disclosure, the cleaning notifier may notify the manager of the need for cleaning at a reasonable time based on the actual number of people using the restroom.

Further, the embodiment 1000 according to the present disclosure includes a supplies replacement notifier 1540 that transmits a supplies replacement signal to the management server 100 based on the headcount value input from the entry headcount calculator 1510. The supplies replacement notifier 1540 derives an estimated consumption value by calculating a ratio of the input headcount value and a preset consumption rate per person. When the estimated consumption value exceeds a reference consumption value, the supplies replacement notifier 1540 sends a supplies replacement signal to the management server 100. For example, when the number of toilet paper sheets used by a person is 7.8, the supplies replacement notifier 1540 derives the number of toilet paper sheets used (estimated consumption value) by multiplying the input headcount value by 7.8. When the derived actual number of toilet paper sheets (estimated consumption value) exceeds the number of toilet paper sheets (reference consumption value) in the toilet compartment, the supplies replacement notifier 1540 sends a toilet paper replacement signal to the server 100.

The embodiment 1000 according to the present disclosure may transmit behavior type information about a subject classified by the abnormal behavior determiner 1200 to a user terminal 200, and may also transmit a cleaning notification signal and a supplies replacement signal generated by the cleaning notifier 1530 and the supplies replacement notifier 1540 to the user terminal 200. The user terminal 200 displays the danger status, sanitary conditions, and lack of supplies on a user interface designed to be perceived by the user. In addition to displaying the restroom status, the user terminal 200 also provides a complaint request unit to the user, allowing the user who recognizes the restroom status to file a complaint with the manager about the danger of a hidden camera currently being installed in the restroom or about a request for additional supplies due to a lack of supplies. In addition, the embodiment 1000 according to the present disclosure also sends the information to the management server 100 in the same manner as above, such that the manager can recognize the restroom status, take necessary actions, and update the restroom status. In addition, the management server 100 transmits, to the user terminal 200, the linkage information linking the restroom information collected by the embodiment 1000 according to the present disclosure to the store information, and the user may check the restroom information related to the stores near the current location through the user terminal 200.

The embodiment 1000 according to the present disclosure includes a warning notifier 1600 configured to emits a warning signal to the outside when the anonymized image data is identified as abnormal behavior data by the abnormal behavior determiner 1200, such that the subject can recognize the warning signal. The warning notifier 1600 emits a set warning signal when it receives an abnormal behavior data signal from the abnormal behavior determiner 1200. The warning signal may take various forms, for example, a warning sound such as a police car siren or a red flashing light. Thus, according to the present disclosure, the act of installing a hidden camera may be stopped immediately, without requiring the presence of the manager or a security personnel. Thereby, a crime may be reliably prevented.

Furthermore, the embodiment 1000 according to the present disclosure includes an emergency notifier 1700 that recognizes an external emergency and transmits an emergency signal to the management server 100. The emergency notifier 1700 recognizes an external situation, such as an assault or robbery in a restroom, and immediately sends an emergency signal to the management server 100. To this end, the emergency notifier 1700 includes a DB 1710 holding rescue signals and a voice recognizer 1720 configured to receive voice generated from the outside. Here, the voice recognizer 1720 is a device capable of recognizing the voice of a victim, for example, a microphone or the like. The emergency notifier 1700 also includes an emergency determiner 1730 that compares the voice signal recognized through the voice recognizer 1720 with the DB 1710 and transmits an emergency signal to the management server 100. The emergency determiner 1730 transmits the emergency signal to the management server 100 when the recognized voice signal is the same as or similar to a rescue signal stored in the DB. Accordingly, the present disclosure may also implement a security function of initially addressing a violent crime that occurs suddenly. Alternatively, the emergency determiner 1730 compares the voice signal with the rescue signal learned by a learning model of the present disclosure, and transmits the emergency signal to the management server 100 when the voice signal recognized from the outside is the same as or similar to the learned rescue signal. The learned rescue signal is learned in a manner similar to the learning model described above. Specifically, the CNN 1210 extracts feature information from the input voice signal, and the LSTM 1220 receives feature information from the CNN 1210 in time series and outputs voice prediction information reflecting temporal changes. The classification layer 1230 compares the voice prediction information input from the LSTM 1220 with the learned voice patterns. The learned voice patterns are divided into a normal signal type and a rescue signal type, and the classification layer 1230 determines which voice pattern the voice prediction information is more similar to among the learned voice patterns based on the similarity, and determines the signal type to which the most similar voice pattern belongs as the signal type of the voice prediction information.

[Method for Determining a Manager].

The embodiment 1000 according to the present disclosure further includes a manager register, a manager comparator, and a manager authorizer in case the actions of the manager in the toilet compartment are similar to the actions of the criminal. For example, the act of replacing toilet paper on a toilet paper holder may have a similar pattern or form to the act of installing a hidden camera on a toilet paper holder. In such cases, the present disclosure includes the manager register, the manager comparator, and the manager authorizer to detect the abnormal behavior without error.

The manager register stores temperature data and/or shape of the manager. The anonymized image data generator 1100 generates anonymized image data by photographing the manager in advance, and the CNN 1210 of the abnormal behavior determiner extracts feature information from the anonymized image data about the manager and transmits the feature information to the manager register. Thus, the manager register stores the feature information about the manager.

The manager comparator compares the feature information about the manager stored in the manager register with the feature information about the subject detected in real time. When the two features are identical, the manager comparator transmits a manager recognition signal to the manager authorizer, and the manager authorizer transmits an interruption signal to at least one of the components except the emergency notifier 1700 of the present disclosure to interrupt the abnormal behavior detection function of the present disclosure. Thus, the security function of the present disclosure may be maintained at all times against unexpected criminal situations.

It will be apparent to those skilled in the art that the present disclosure may be embodied in other specific forms without departing from the features of the present disclosure. Accordingly, the above detailed description should not be construed as limiting in any respect and should be considered exemplary. The scope of this disclosure shall be determined by a reasonable interpretation of the appended claims, and all changes within the equivalents of the present disclosure shall be within the scope of the present disclosure.

The invention claimed is:

1. A deep learning-based abnormal behavior detection system comprising:
    a detection device configured to detect a behavior of a subject within a predetermined area and generate anonymized image data;
    a deep learning server configured to:
    receive the anonymized image data from the detection device;
    extract feature information from the anonymized image data;
    output behavior prediction information reflecting temporal changes of the feature information;
    compare the behavior prediction information with pre-learned behavior patterns to calculate similarity; and
    determine whether the behavior prediction information belongs to a normal behavior type or an abnormal behavior type based on the similarity to determine abnormal behavior; and
    a web server configured to receive a result of determining the abnormal behavior from the deep learning server and to generate and transmit to a management server or a terminal a warning signal indicating that the behavior of the subject is an abnormal behavior when the anonymized image data is determined to belong to the abnormal behavior type.

2. The deep learning-based abnormal behavior detection system of claim 1, wherein the detection device comprises a time of flight (ToF) sensor.

3. The deep learning-based abnormal behavior detection system of claim 1, wherein the deep learning server comprises:
    a convolutional neural network (CNN) configured to extract feature information from the received anonymized image data; an long short term memory networks (LSTM) configured to receive the feature information from the CNN in time series and output the behavior prediction information reflecting the temporal changes; and
    a classification layer configured to compare the behavior prediction information received from the LSTM with the learned behavior patterns,
    wherein the classification layer determines a learned behavioral pattern most similar to the behavior prediction information among the learned behavioral patterns based on the similarity, and determines a behavior type to which the most similar behavior pattern belongs as a behavior type of the behavior prediction information.

4. A deep learning-based abnormal behavior detection system for detecting a behavior of a subject within a predetermined area and analyzing a behavior pattern, comprising:
    a receiver configured to receive anonymized image data in time series from a sensor configured to detect the predetermined area, the anonymized image data being generated by detecting the behavior of the subject within the predetermined area;
    an abnormal behavior determiner configured to:
    extract feature information from the received anonymized image data;
    output behavior prediction information reflecting temporal changes of the feature information;
    compare the behavior prediction information with pre-learned behavior patterns to calculate similarity; and
    determine whether the behavior prediction information belongs to a normal behavior type or an abnormal behavior type based on the similarity to determine abnormal behavior; and
    a transmitter configured to transmit to a management server or terminal a signal indicating that the behavior of the subject is an abnormal behavior, when the anonymized image data is determined by the abnormal behavior determiner to belong to the abnormal behavior type.

5. The deep learning-based abnormal behavior detection system of claim 4, wherein the sensor is a time of flight (ToF) sensor or a thermal imaging sensor.

6. The deep learning-based abnormal behavior detection system of claim 4, wherein the abnormal behavior determiner comprises:
    the CNN configured to extract feature information from the received anonymized image data; the LSTM configured to receive the feature information from the CNN in time series and output the behavior prediction information reflecting the temporal changes; and
    a classification layer configured to compare the behavior prediction information received from the LSTM with the learned behavior patterns,
    wherein the classification layer determines a learned behavioral pattern most similar to the behavior prediction information among the learned behavioral patterns based on the similarity, and determines a behavior type to which the most similar behavior pattern belongs as a behavior type of the behavior prediction information.

7. The deep learning-based abnormal behavior detection system of claim 4, further comprising:
    a warning notifier configured to generate a warning signal to be recognized by the subject when the anonymized image data is identified as abnormal behavior data by the abnormal behavior determiner.

8. The deep learning-based abnormal behavior detection system of claim 4, further comprising:
    an emergency notifier configured to transmit, when the anonymized image data is identified as abnormal behavior data by the abnormal behavior determiner, an emergency signal to the management server in recognition of an external emergency.

* * * * *